United States Patent
Hu et al.

(10) Patent No.: US 10,049,068 B2
(45) Date of Patent: Aug. 14, 2018

(54) SAS SYSTEM, SAS SYSTEM TRAVERSAL METHOD, AND APPARATUS

(71) Applicant: HUAWEI TECHNOLOGIES CO., LTD., Shenzhen, Guangdong (CN)

(72) Inventors: Yu Hu, Chengdu (CN); Na Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/590,003

(22) Filed: May 8, 2017

(65) Prior Publication Data
US 2017/0242815 A1 Aug. 24, 2017

Related U.S. Application Data

(63) Continuation of application No. PCT/CN2014/090813, filed on Nov. 11, 2014.

(51) Int. Cl.
| | | |
|---|---|---|
| G06F 13/42 | (2006.01) | |
| G06F 13/38 | (2006.01) | |
| G06F 13/40 | (2006.01) | |
| H04L 12/751 | (2013.01) | |
| H04L 29/06 | (2006.01) | |
| G06F 13/14 | (2006.01) | |

(52) U.S. Cl.
CPC ........... *G06F 13/385* (2013.01); *G06F 13/14* (2013.01); *G06F 13/4022* (2013.01); *G06F 13/4282* (2013.01); *H04L 29/06* (2013.01); *H04L 45/02* (2013.01)

(58) Field of Classification Search
CPC .................................................. G06F 13/385
USPC ................................... 710/306, 316; 709/251
See application file for complete search history.

(56) References Cited

U.S. PATENT DOCUMENTS

| | | | | |
|---|---|---|---|---|
| 8,190,790 B1 * | 5/2012 | Ogawa | ..................... | H04L 45/02 370/252 |
| 8,797,918 B1 * | 8/2014 | Nguyen | ................... | G06F 13/14 370/254 |

(Continued)

FOREIGN PATENT DOCUMENTS

| | | |
|---|---|---|
| CN | 101534304 A | 9/2009 |
| CN | 103455464 A | 12/2013 |

(Continued)

OTHER PUBLICATIONS

Working Draft American National Standard Project T10/1601-D Revision 4 Mar. 2004 Information technonlgy—Serial Attached SCSI-1.1 (SAS-1.1) (Year: 2004)*

*Primary Examiner* — Paul R Myers
(74) *Attorney, Agent, or Firm* — Huawei Technologies Co., Ltd.

(57) ABSTRACT

A SAS system includes an SAS controller, a first expansion card, a second expansion card, and a third expansion card. The first expansion card includes a first port and a second port. The second expansion card and the third expansion card establish a communication connection to the SAS controller by using the first expansion card. The first expansion card establishes a communication connection to the second expansion card through the first port. The first expansion card establishes a communication connection to the third expansion card through the second port. The second expansion card is connected to the third expansion card.

10 Claims, 5 Drawing Sheets

(56) References Cited

U.S. PATENT DOCUMENTS

| | | | | |
|---|---|---|---|---|
| 9,320,169 | B2* | 4/2016 | Adrian | H05K 7/1494 |
| 2005/0066100 | A1* | 3/2005 | Elliott | G06F 13/387 |
| | | | | 710/300 |
| 2007/0070994 | A1* | 3/2007 | Burroughs | G06F 1/206 |
| | | | | 370/381 |
| 2008/0162987 | A1* | 7/2008 | El-Batal | G06F 3/0616 |
| | | | | 714/6.12 |
| 2009/0125655 | A1* | 5/2009 | Jones | G06F 13/387 |
| | | | | 710/104 |
| 2009/0259791 | A1* | 10/2009 | Mizuno | G06F 3/0613 |
| | | | | 710/316 |
| 2011/0093625 | A1* | 4/2011 | Yoneda | G06F 11/201 |
| | | | | 710/19 |
| 2011/0320706 | A1* | 12/2011 | Nakajima | G06F 11/0793 |
| | | | | 711/114 |
| 2013/0311719 | A1* | 11/2013 | Doedline, Jr. | G06F 3/0613 |
| | | | | 711/114 |
| 2013/0315058 | A1 | 11/2013 | Otaka et al. | |
| 2014/0025850 | A1* | 1/2014 | Varchavtchik | G06F 3/0689 |
| | | | | 710/74 |
| 2014/0173165 | A1* | 6/2014 | Madhusudana | G06F 13/4282 |
| | | | | 710/316 |

FOREIGN PATENT DOCUMENTS

| | | | |
|---|---|---|---|
| CN | 103475695 | A | 12/2013 |
| EP | 2677430 | A1 | 12/2013 |
| JP | 2009187483 | A | 8/2009 |
| JP | 2013246713 | A | 12/2013 |

\* cited by examiner

SAS SYSTEM, SAS SYSTEM TRAVERSAL METHOD, AND APPARATUS

CROSS-REFERENCE TO RELATED APPLICATIONS

This application is a continuation of International Application No. PCT/CN2014/090813, filed on Nov. 11, 2014, the disclosure of which is hereby incorporated by reference in its entirety.

TECHNICAL FIELD

The present application relates to the communications field, and in particular, to a serial attached small computer system interface (SAS) system, an SAS system traversal method, and an apparatus.

BACKGROUND

A serial attached small computer system interface (SAS) system, also known as a serial attached SCSI (small computer system interface) system or a SAS domain, is a new generation serial point-to-point interface for enterprise level storage devices. The SAS system has a high expansion capability and may be connected to a large quantity of disk devices by using SAS expansion devices (also known as expansion cards). Generally, a set of devices including an SAS controller and multiple expansion cards form an SAS system. As shown in FIG. 1, an SAS controller in an existing SAS system has multiple controller ports and may be connected to multiple expansion cards. A controller port 1 in the existing SAS system is used as an example. The controller port 1 is connected to an expansion card 1, and the expansion card 1 has multiple expansion card ports and may be connected to hard disks and/or other expansion cards. For example, an expansion card port 1 is connected to an expansion card 2, and an expansion card port 2 is connected to an expansion card 3. Similar to the expansion card 1, the expansion card 2 may also be connected to multiple expansion cards and hard disks. A structure of connections between expansion cards in the entire SAS system is tree-like, and therefore, a quantity of expansion cards and hard disks in the entire SAS system can be fully expanded. Similar to the expansion card 1, the expansion card 3 may be also connected to multiple expansion cards and hard disks.

In the SAS system, if a hard disk connected to an expansion card needs to be read, for example, a hard disk connected to an expansion card 5 needs to be read, the expansion card 5 can receive a read instruction sent by the SAS controller and executes a corresponding action only after the read instruction is routed to the expansion card 2 via the expansion card 1, routed to an expansion card 4 via the expansion card 2, and then routed to the expansion card 5 via the expansion card 4. During this process, if a problem occurs in any part of a routing path from the expansion card 5 to the SAS controller, for example, the expansion card 1 becomes faulty, a communication channel between the expansion card 1 and the expansion card 2 is disconnected, or the expansion card 2 becomes faulty, the expansion card 5 cannot receive the instruction from the SAS controller, resulting in a fault in the entire system. In addition, because the SAS system has a strong expansion capability, a depth of cascading between the expansion cards may be relatively large, the probability of fault and losses due to the fault may also increase accordingly.

SUMMARY

According to the present application, a problem of relatively low stability and reliability of an SAS system due to the tree-like networking between expansion cards in the existing SAS systems can be resolved.

A first aspect of embodiments of the present application provides a serial attached small computer system interface (SAS) system, where the SAS system includes an SAS controller, a first expansion card, a second expansion card, and a third expansion card, and the first expansion card includes a first port and a second port;
  the second expansion card and the third expansion card establish a communication connection to the SAS controller by using the first expansion card;
  the first expansion card establishes a communication connection to the second expansion card through the first port;
  the first expansion card establishes a communication connection to the third expansion card through the second port; and
  the second expansion card is connected to the third expansion card.

With reference to the first aspect, in a first implementation manner of the first aspect, the second expansion card includes a third port, and the third expansion card includes a fourth port;
  that the second expansion card is connected to the third expansion card specifically includes: the third port is connected to the fourth port; and
  the second expansion card broadcasts a received SAS system status change message through a port except the third port, and the third expansion card broadcasts a received SAS system status change message through a port except the fourth port.

With reference to the first implementation manner of the first aspect, in a second implementation manner of the first aspect, the third port and the fourth port are subtractive attribute ports.

With reference to the first aspect, in a third implementation manner of the first aspect, the second expansion card does not broadcast a received SAS system status change message, or the third expansion card does not broadcast a received SAS system status change message.

With reference to the first aspect and the first, the second, and the third implementation manners of the first aspect, in a fourth implementation manner of the first aspect, the SAS controller is configured to initiate an expansion card traversal to obtain a topology structure of expansion cards of the SAS system;
  the SAS controller is further configured to: receive topology structure information returned by the second expansion card, where the topology structure information returned by the second expansion card includes: the second expansion card is connected to the third expansion card; and receive topology structure information returned by the third expansion card, where the topology structure information returned by the third expansion card includes: the third expansion card is connected to the second expansion card; and
  in the expansion card traversal, the second expansion card is no longer used as a to-be-traversed expansion card, and the third expansion card is no longer used as a to-be-traversed expansion card.

With reference to the fourth implementation manner of the first aspect, in a fifth implementation manner of the first aspect, the SAS controller is further configured to: calculate a shortest path from the SAS controller to the third expansion card according to the obtained topology structure of the expansion card of the SAS system, and in a case in which the shortest path from the SAS controller to the third expansion card passes through the second expansion card, establish routing tables of the first expansion card and the second expansion card according to the shortest path from the SAS controller to the third expansion card.

A second aspect of the embodiments of the present application provides an expansion card traversal method of a serial attached small computer system interface (SAS) system, where the SAS system includes an SAS controller, a first expansion card, a second expansion card, and a third expansion card; and the expansion card traversal method includes:
  initiating an expansion card traversal to obtain a topology structure of expansion cards of the SAS system;
  receiving, by using the first expansion card, topology structure information returned by the second expansion card, where the topology structure information returned by the second expansion card includes: the second expansion card is connected to the third expansion card; and receiving, by using the first expansion card, topology structure information returned by the third expansion card, where the topology structure information returned by the third expansion card includes: the third expansion card is connected to the second expansion card; and
  in the expansion card traversal, skipping using the second expansion card as a to-be-traversed expansion card, and skipping using the third expansion card as a to-be-traversed expansion card.

With reference to the second aspect, in a first implementation manner of the second aspect, the method further includes: calculating a shortest path from the SAS controller to the third expansion card according to the obtained topology structure of the expansion card of the SAS system, and in a case in which the shortest path from the SAS controller to the third expansion card passes through the second expansion card, establishing routing tables of the first expansion card and the second expansion card according to the shortest path from the SAS controller to the third expansion card.

A third aspect of the embodiments of the present application provides a control device, including:
  a processor, a memory, a communication interface, and a bus, where the processor, the memory, and the communication interface communicate with each other by using the bus, where
  the communication interface is configured to communicate with an expansion card;
  the memory is configured to store a program; and
  when the control device runs, the processor is configured to execute the program stored in the memory, so as to execute any method according to the second aspect of the embodiments of the present application.

A fourth aspect of the embodiments of the present application provides a control apparatus, where the control apparatus is used for an SAS system, and the SAS system includes: the control apparatus, a first expansion card, a second expansion card, and a third expansion card; and the control apparatus includes:
  a traversal initiating unit, configured to initiate an expansion card traversal to obtain a topology structure of expansion cards of the SAS system; and
  a traversal processing unit, configured to: receive, by using the first expansion card, topology structure information returned by the second expansion card, where the topology structure information returned by the second expansion card includes: the second expansion card is connected to the third expansion card; receive, by using the first expansion card, topology structure information returned by the third expansion card, where the topology structure information returned by the third expansion card includes: the third expansion card is connected to the second expansion card; and no longer use the second expansion card as a to-be-traversed expansion card and no longer use the third expansion card as a to-be-traversed expansion card.

With reference to the fourth aspect, in a first implementation manner of the fourth aspect, the control apparatus further includes:
  a routing table management unit, configured to: calculate a shortest path from the SAS controller to the third expansion card according to the obtained topology structure of the expansion card of the SAS system, and in a case in which the shortest path from the SAS controller to the third expansion card passes through the second expansion card,
  establish routing tables of the first expansion card and the second expansion card according to the shortest path from the SAS controller to the third expansion card.

A fifth aspect of the embodiments of the present application provides an expansion card, where the expansion card includes a first port and a second port;
  the expansion card establishes a communication connection to still another expansion card through the first port via another expansion card; and
  the expansion card is connected to the still another expansion card through the second port.

With reference to the fifth aspect, in a first implementation manner of the fifth aspect, the expansion card broadcasts a received SAS system status change message through a port except the second port.

With reference to the first implementation manner of the fifth aspect, in a second implementation manner of the fifth aspect, the second port is a subtractive attribute port.

With reference to the fifth aspect, in a third implementation manner of the fifth aspect, the expansion card does not broadcast a received SAS system status change message.

According to the embodiments provided above, a topology structure of an expansion card in an SAS system is set to be annular, that is, two expansion cards extended from different ports of a same expansion card are directly connected, so that an expansion card in the SAS system actually has two possible communication channels to an SAS controller, which improves reliability and stability of the SAS system.

BRIEF DESCRIPTION OF DRAWINGS

The following briefly describes the accompanying drawings used in describing the prior art and embodiments of the application.

DESCRIPTION OF EMBODIMENTS

The following describes the technical solutions in the embodiments of the present application with reference to the accompanying drawings.

Figure 1:
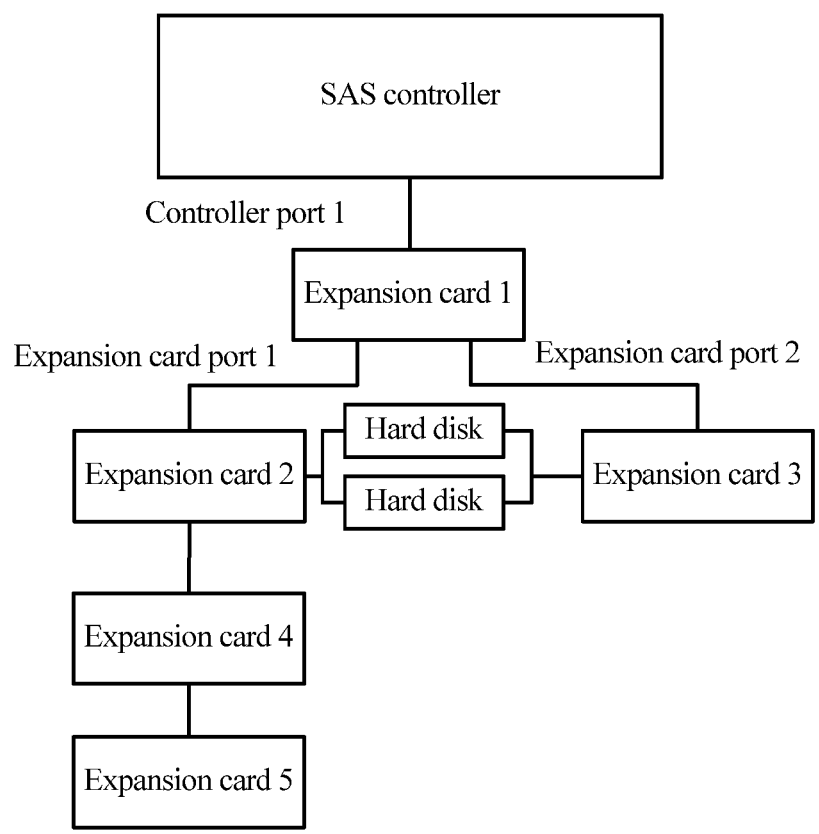
FIG. 1 is a schematic structural diagram of an SAS system according to the prior art.
Figure 2:
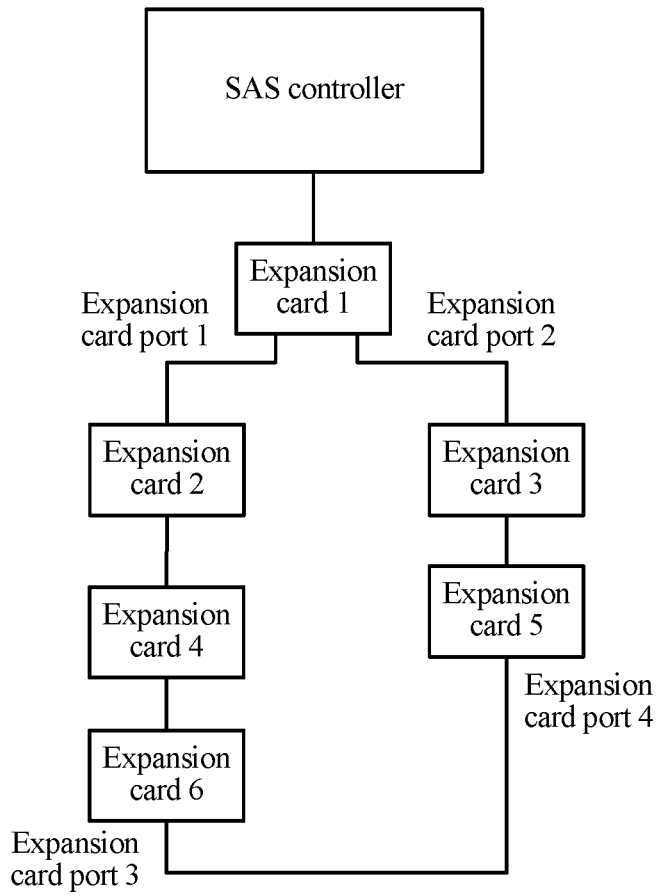
FIG. 2 is a schematic structural diagram of an SAS system according to embodiment 1 of the present application.

Embodiments of the present application provide an SAS system. As shown in FIG. 2, the SAS system includes: an SAS controller, configured to manage one or more expansion cards and hard disks that belong to the entire SAS system. Management functions of the SAS controller include sending operation instructions to the expansion cards, acquiring a topology structure of the SAS system and setting a routing table of the expansion cards, monitoring status changes of the SAS system, and so on. The SAS controller includes multiple controller ports, and each SAS controller may be connected to multiple expansion cards. For brevity, a case of only one SAS controller in an SAS system is described in the specification. It should be noted that, the SAS system may include multiple SAS controllers that jointly manage the SAS system.

An expansion card includes multiple interfaces, where some interfaces may be configured to connect to hard disks, and some interfaces may be configured to connect to other expansion cards, so that the quantity of hard disks connected in the entire SAS system can be expanded. In addition, an expansion card further has functions similar to those of a router. When the SAS controller sends an operation instruction, an expansion card receiving the operation instruction sends the operation instruction to a next expansion card through a port according to a preset routing table, so that the operation instruction can reach an expected expansion card. The expansion card may further include functions of acquiring the topology structure of the SAS system and setting the routing table of the expansion card.

Based on the foregoing content, the embodiments of the present application provide an SAS system that is different from the prior art SAS system, an SAS system traversal method, and an apparatus.

Throughout the specification, the term "expansion card" can also be referred to as an expander or an expansion device. The expansion card is a switching device in an SAS system, and is configured to perform data communication between expansion cards or between an expansion card and an SAS controller. In addition, the expansion card may be further directly connected to various types of hard disks or other terminal devices in the SAS system.

Throughout the specification, the term "communication connection" or "connection" represents that communication can be performed between expansion cards or between an expansion card and an SAS controller through a communication channel. The communication channel may include one or more expansion cards. Alternatively, "communication connection" or "connection" may represent a direct connection between the expansion cards or between the expansion card and the SAS controller. For example, in FIG. 2, a communication connection is established between an expansion card 6 and an expansion card 1 by using an expansion card 2 and an expansion card 4. A communication connection is established between the expansion card 2 and the expansion card 6 by using the expansion card 4. A communication connection is directly established between the expansion card 6 and the expansion card 4.

Throughout the specification, the term "connect to" represents that expansion cards are directly connected. As shown in FIG. 2, the expansion card 6 is connected to an expansion card port 4 of an expansion card 5 through an expansion card port 3. The expansion card 6 and the expansion card 5 can directly communicate with each other without using another expansion card, that is, the expansion card 6 is connected to the expansion card 5.

Throughout the specification, the term "SAS system status change message" represents a broadcast message sent by an expansion card in an SAS system to another expansion card connected to the expansion card, when the expansion card detects that a device assembled on a port of the expansion card changes, for example, plug-in or plug-out of a hard disk or a fault of the hard disk. The broadcast message is used for notifying the other expansion card that the device assembled on the expansion card has changed. In addition, after obtaining the SAS system status change message, a control device in the SAS system, for example, an SAS controller, initiates a status traversal query for each expansion card in the SAS system. In practice, the SAS system status change message may be designed as a primitive message, for example, BROADCAST (CHANGE) primitive. Therefore, the SAS system status change message may also be referred to as broadcast primitive.

Throughout the specification, the term "expansion card traversal" represents that after receiving an SAS system status change message, a management device in an SAS system, for example, an SAS controller, learns that a state of a device in the SAS system changes, and successively initiates traversal for each expansion card in the SAS system, so as to learn a state of each expansion card in the SAS system and a state of each device assembled on each expansion card. After learning a state of each expansion card in the SAS system, the SAS controller may further design a routing table of each expansion card according to the state, so that the SAS controller can successfully access a device (for example, a hard disk) assembled on the expansion card.

Embodiment 1

The embodiment 1 of the present application provides an SAS system, and a schematic structural diagram of the SAS system is shown in FIG. 2. The SAS system includes an SAS controller and expansion cards 1-6, where an expansion card 1 includes an expansion card port 1 and an expansion card port 2. An expansion card 6 and an expansion card 5 establish a communication connection to the SAS controller by using the expansion card 1. The expansion card 1 establishes a communication connection to the expansion card 6 through the expansion card port 1. The expansion card 1 establishes a communication connection to the expansion card 5 through the expansion card port 2; and the expansion card 6 is connected to the expansion card 5.

In the foregoing design of the SAS system, a channel through which the SAS controller accesses the expansion card 6 is used as an example. The SAS controller may access the expansion card 6 by using a channel of expansion cards 1, 2, 4, and 6, or by using a channel of expansion cards 1, 3, 5, and 6. Therefore, if a fault occurs in either of the two channels, the SAS controller can still access the expansion card 6 by using the other channel. This improves reliability of the SAS system.

Specifically, the expansion card 6 establishes a communication connection to the SAS controller by using the expansion cards 1, 2, and 4. The expansion card 5 establishes a communication connection to the SAS controller by using the expansion cards 1 and 3. The expansion card 1 may also establish a communication connection to the SAS controller by using another expansion card.

Optionally, the expansion card 6 includes an expansion card port 3, and the expansion card 5 includes an expansion card port 4. Then, the expansion card 6 connecting to the expansion card 5 specifically includes: the expansion card port 3 of expansion card 6 connects to the expansion card port 4 of expansion card 5. If the expansion card 6 receives an SAS system status change message, the expansion card 6 broadcasts the SAS system status change message to all expansion cards connected to the expansion card 6, except an expansion card that sends the SAS system status change message. In this case, all the expansion cards connected to the expansion card 6, except the expansion card that sends the SAS system status change message, is the expansion card 5.

After receiving the SAS system status change message sent by the expansion card 6, the expansion card 5 continues to broadcast the SAS system status change message to the expansion card 3. Then, the expansion card 3 broadcasts the SAS system status change message to the expansion card 1. The expansion card 1 broadcasts the SAS system status change message to the expansion card 2. The expansion card 2 broadcasts the SAS system status change message to the expansion card 4. The expansion card 4 broadcasts the SAS system status change message back to the expansion card 6, and the expansion card 6 continues the broadcast cycle again.

To prevent the SAS system status change message from being limitlessly broadcast in the SAS system, after receiving the SAS system status change message, the expansion card 6 does not send the SAS system status change message to the expansion card 5 through the expansion card port 3. In addition, after receiving the SAS system status change message, the expansion card 5 also does not send the SAS system status change message to the expansion card 6 through the expansion card port 4. Therefore, the SAS system status change message cannot be transmitted between the expansion card port 3 and the expansion card port 4, and the SAS system status change message is not circularly broadcast in the SAS system.

Specifically, after receiving the SAS system status change message, the expansion card 6 does not send the SAS system status change message to the expansion card 5 through the expansion card port 3. In addition, after receiving the SAS system status change message, the expansion card 5 also does not send the SAS system status change message to the expansion card 6 through the expansion card port 4. For the expansion card 5 and the expansion card 6, there are multiple ways for implementing the function. In an expansion card, three types of expansion card ports are defined, that is, direct attribute port, table attribute port, and subtractive attribute port. Generally, a direct attribute port is configured to directly connect to a hard disk device, a table attribute port is configured to connect to another expansion card, and a subtractive attribute port is a special port. The SAS protocol stipulates that only one subtractive attribute port can be configured on one expansion card. When a forwarding port for a received data packet cannot be found in a routing table of the expansion card, the data packet is sent by using the subtractive attribute port. In practice, the expansion card port 3 and the expansion card port 4 may be set as subtractive attribute ports. When broadcasting a SAS system status change message received by the expansion card 5 and the expansion card 6, the expansion card 5 and the expansion card 6 do not broadcast the SAS system status change message by using the subtractive attribute ports. Alternatively, the expansion card port 3 and the expansion card port 4 may be set as table attribute ports. When broadcasting a SAS system status change message received by the expansion card 6 and the expansion card 5, the expansion card 6 and the expansion card 5 do not broadcast the SAS system status change message by using the table attribute ports. In practice, there may be multiple ways for achieving the objective, and details are not described herein.

Optionally, during resolving the foregoing problem that an SAS system status change message is circularly broadcast, the expansion card 6 may also not broadcast a SAS system status change message received by the expansion card 6. That is, when any expansion card sends an SAS system status change message to the expansion card 6, the expansion card 6 does not broadcast the SAS system status change message to another expansion card. However, when a device assembled on the expansion card 6 changes, that is, the expansion card 6 generates an SAS system status change message, the expansion card 6 still broadcasts the SAS system status change message to another expansion card connected to the expansion card 6. Alternatively, the function of the expansion card 6 may be implemented by any expansion card in the SAS system.

It should be noted that, the foregoing setting of the expansion card 6 or the expansion card 5 may be performed in an out-of-band manner, that is, the expansion card 6 or the expansion card 5 is directly configured by using an interface of the expansion card 6 or the expansion card 5. Alternatively, the foregoing setting of the expansion card 6 or the expansion card 5 may be performed in an in-band manner, that is, a configuration message is delivered to the expansion card 6 or the expansion card 5 by using the SAS controller, or the expansion card 6 or the expansion card 5 may be set at delivery.

Optionally, the SAS controller is configured to initiate an expansion card traversal to obtain a topology structure of expansion cards of the SAS system. The SAS controller receives topology structure information returned by the expansion card 5. The topology structure information returned by the expansion card 5 includes: the expansion card 5 is connected to the expansion card 6. The SAS controller further receives topology structure information returned by the expansion card 6. The topology structure information returned by the expansion card 6 includes: the expansion card 6 is connected to the expansion card 5. Further in the expansion card traversal, the SAS controller no longer uses the expansion card 5 as a to-be-traversed expansion card and no longer uses the expansion card 6 as a to-be-traversed expansion card.

Specifically, after the SAS controller receives an SAS system status change message or when the SAS system needs to initialize an expansion card, to ensure normal running of the SAS system, the SAS controller initiates the expansion card traversal to obtain the topology structure of the expansion cards of the SAS system and information about each device assembled on each expansion card (for example, hard disk information). The expansion card traversal may be specifically: sending a REPORT GENERAL request to the expansion cards. In practice, a breadth-first traversal sequence is generally used for the expansion card traversal. The SAS system in FIG. 2 is used as an example. The SAS controller first sends the REPORT GENERAL request to the expansion card 1. After receiving the REPORT GENERAL request, the expansion card 1 notifies the SAS controller that the expansion card 1 is connected to the expansion card 2 and the expansion card 3. The SAS controller takes the expansion card 2 and the expansion card 3 as to-be-traversed expansion cards and successively resends the REPORT GENERAL request to the expansion card 2 and the expansion card 3. By analogy, situations of all the expansion cards in the SAS system are acquired.

During the expansion card traversal process, if the SAS controller receives the topology structure information, returned by the expansion card 5 and indicating that the expansion card 5 is connected to the expansion card 6, and further receives the topology structure information, returned by the expansion card 6 and indicating that the expansion card 6 is connected to the expansion card 5, the SAS controller learns that a topology structure between the expansion card 5 and the expansion card 6 is not tree-like, but annular. In this case, the expansion card 5 and the expansion card 6 do not continue to be taken as the to-be-traversed expansion cards, so as to prevent traversal from being circulated between the expansion card 5 and the expansion card 6. In a next step of the expansion card traversal, another expansion card, which is connected to the expansion card 5 and other than the expansion card 6, or another expansion card, which is connected to the expansion card 6 and other than the expansion card 5, is taken as the to-be-traversed expansion card.

It should be noted that, in a case in which the foregoing expansion card 5 and expansion card 6 exist in the SAS system, if a communication channel between two expansion cards in the SAS system is disconnected, for example, a communication channel between the expansion card 4 and the expansion card 6 is disconnected, after initiating the expansion card traversal, the SAS controller does not find that the expansion card 5 and the expansion card 6 are connected. In this case, the SAS controller redesigns a routing table of each expansion card according to a current topology structure, and the entire SAS system can still normally run.

Optionally, the SAS controller is further configured to: establish routing tables of expansion cards 1-6 according to the obtained topology structure of the expansion cards of the SAS system, and respectively send the routing tables of the expansion cards 1-6 to the expansion cards.

Specifically, after completing the expansion card traversal in the SAS system, the SAS controller obtains a topology structure among all the expansion cards in the SAS system, calculates a shortest path from the SAS controller to each expansion card according to the topology structure of the expansion cards of the SAS system, and sets the routing tables of the expansion cards in the SAS system according to the shortest paths. The shortest path herein refers to a path with a lowest quantity of hops between the expansion cards for an operation request sent by the SAS controller to reach a target expansion card.

FIG. 2 is used as an example. After the SAS controller obtains the topology structure of the expansion card, there are two communication channels from the SAS controller to the expansion card 5, that is, expansion cards 1-2-4-6-5 or expansion cards 1-3-5. The SAS controller selects a shorter one of the two communication channels, that is, the expansion cards 1-3-5, and sets routing tables of the expansion card 1 and the expansion card 3 according to the shortest path. After the expansion card 1 receives an operation request sent by the SAS controller to the expansion card 5, the expansion card 1 sends the operation request to the expansion card 3 according to the foregoing set routing table of the expansion card 1. The expansion card 3 sends the operation request to the expansion card 5 according to the foregoing set routing table of the expansion card 3. Similarly, there are two communication channels from the SAS controller to the expansion card 4: expansion cards 1-2-4 and expansion cards 1-3-5-6-4, and therefore, a shortest path from the SAS controller to the expansion card 4 is the expansion cards 1-2-4. Routing tables of the expansion card 1 and the expansion card 2 are set according to the shortest path, so that an operation request sent by the SAS controller to the expansion card 4 can be sent to the expansion card 4 by using the expansion card 1 and the expansion card 2. By analogy, establishment of a routing table of an expansion card in the shortest path from the SAS controller to each expansion card in the SAS system supports sending of an operation request of the SAS controller to each expansion card by using the shortest path.

In this embodiment, a topology structure of expansion cards in an SAS system is set to be annular, that is, two expansion cards extended from different ports of a same expansion card are directly connected, so that an expansion card in the SAS system actually has at least two possible communication channels to an SAS controller. When a fault occurs in one channel of the two communication channels, running of the entire SAS system may continue to be maintained by resetting a routing table of each expansion card. An SAS system with low reliability is optimized, where due to a tree-like topology structure of expansion cards in a conventional SAS system, all child expansion cards connected to an expansion card are failed when the expansion card becomes faulty. In addition, a problem that an SAS system status change message is circularly broadcast because of system improvement is resolved by improving a manner in which an expansion card processes the SAS system status change message.

Embodiment 2

Figure 3:
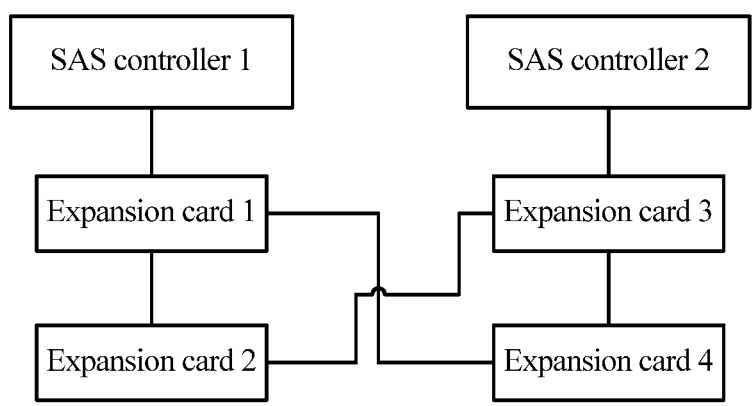
FIG. 3 is a schematic structural diagram of an SAS system according to embodiment 2 of the present application.

The embodiment 2 of the present application provides an SAS system, and a schematic structural diagram of the SAS system is shown in FIG. 3. It should be noted that, this embodiment is a supplement to the embodiment 1 and mainly illustrates a networking structure of an expanded SAS system. However, specific implementation of each device in the system is not essentially different from that of the embodiment 1, and details are not described herein again.

As shown in FIG. 3, in practice, an SAS system may include multiple SAS controllers. In this case, a topology structure of an expansion card of the SAS system may be more complex, but essence of the topology structure is similar to that of the embodiment 1. For example, for an SAS controller 1, an expansion card 1 is connected to the SAS controller 1. An expansion card 3 establishes a communication connection to the expansion card 1 by using an expansion card 2. An expansion card 4 establishes a communication connection to the expansion card 1, and the expansion card 3 is connected to the expansion card 4. For an SAS controller 2, the expansion card 3 is connected to the SAS controller 2, the expansion card 1 establishes a communication connection to the expansion card 3 by using the expansion card 2, the expansion card 4 establishes a communication connection to the expansion card 3, and the expansion card 1 is connected to the expansion card 4. That is, in the SAS system, for each SAS controller, a topology structure of an expansion card that is of the SAS system and that is controlled by the SAS controller is similar to that of the embodiment 1.

Embodiment 3

Figure 4:
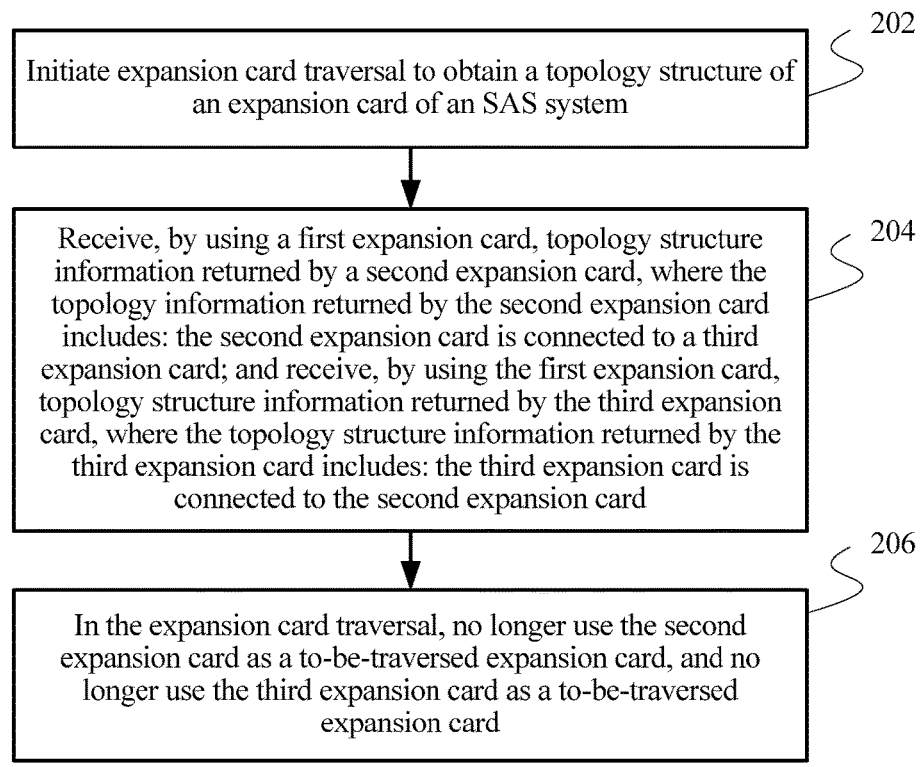
FIG. 4 is a flowchart of an expansion card traversal method of an SAS system according to embodiment 3 of the present application.

This embodiment of the present application provides an expansion card traversal method of an SAS system, and a schematic flowchart of the expansion card traversal method is shown in FIG. 4. The SAS system in which the traversal method is applied includes an SAS controller, a first expansion card, a second expansion card, and a third expansion card. The traversal method may be executed by the SAS controller or an expansion card integrating some functions of the SAS controller. For ease of description, the SAS controller is used as an entity for executing the method.

The traversal method includes:

Step 202: Initiate an expansion card traversal to obtain topology structure of expansion cards of the SAS system.

Specifically, after the SAS controller receives an SAS system status change message or when the SAS system needs to initialize an expansion card, to ensure normal running of the SAS system, the SAS controller initiates the expansion card traversal to obtain the topology structure of the expansion cards of the SAS system and information about hard disks attached to the expansion cards. The initiating the expansion card traversal may be specifically: sending a REPORT GENERAL request to the expansion cards.

Step 204: Receive, via the first expansion card, topology structure information returned by the second expansion card, where the topology structure information returned by the second expansion card includes that the second expansion card is connected to the third expansion card; and receive, via the first expansion card, topology structure information returned by the third expansion card, where the topology structure information returned by the third expansion card includes that the third expansion card is connected to the second expansion card.

Specifically, after the SAS controller sends the REPORT GENERAL request to the second expansion card and the third expansion card, the second expansion card and the third expansion card return, to the SAS controller via the first expansion card, information about expansion cards connected to the second expansion card and the third expansion card, that is, topology structure information. The SAS controller uses expansion cards included in the topology structure information as to-be-traversed expansion cards, and sends the REPORT GENERAL request to these expansion cards in a next round of traversal. If the topology structure information returned by the second expansion card includes information about the third expansion card, for example, an ID number of the third expansion card, it indicates that the second expansion card is connected to the third expansion card. Similarly, if the topology structure information returned by the third expansion card includes information about the second expansion card, it indicates that the third expansion card is connected to the second expansion card. A connection relationship between the second expansion card and the third expansion card is similar to that of an expansion card 5 and an expansion card 6 in the system embodiment 1. In addition, the topology structure information returned by the second expansion card further includes information about another expansion card connected to the second expansion card, for example, an ID number. The topology structure information returned by the third expansion card further includes information about another expansion card connected to the third expansion card.

Step 206: In the following expansion card traversal, the second expansion card and the third expansion card are not used as to-be-traversed expansion cards after receiving the topology structure information returned by the second expansion card and the third expansion card respectively.

For details, refer to an action of an SAS controller in the embodiment 1. If it is found in step 204 that the connection relationship between the second expansion card and the third expansion card is similar to that of the expansion card 5 and the expansion card 6 in the system embodiment 1, that is, the second expansion card and the third expansion card are two expansion cards extended from different ports of a same expansion card, and the second expansion card is connected to the third expansion card, the SAS controller does not use the second expansion card and the third expansion card as to-be-traversed expansion cards, so as to prevent the expansion card traversal from being circulated between the second expansion card and the third expansion card. In addition, another expansion card connected to the second expansion card and the third expansion card is used as a to-be-traversed expansion card, and the REPORT GENERAL request is sent to the other expansion card in a next step of the expansion card traversal, until all expansion cards in the SAS system are entirely traversed and a result of the expansion card traversal of the SAS system is obtained.

Optionally, after step 206, the SAS controller further generates the topology structure of the expansion card of the SAS system according to the result of the expansion card traversal. FIG. 2 is used as an example. The topology structure of the expansion cards of the SAS system is: child expansion cards of expansion card 1 are expansion card 2 and expansion card 3, child expansion card of the expansion card 2 is expansion card 4, child expansion card of the expansion card 3 is expansion card 5, and child expansion cards of both the expansion card 4 and the expansion card 5 is expansion card 6, where a child expansion card of an expansion card refers to an expansion card that is connected to the expansion card and that establishes a communication connection to the SAS controller by using the expansion card. According to connection relationships of the expansion cards, the SAS controller respectively establishes routing tables of the first expansion card, the second expansion card, and the third expansion card, sends a routing table of the first expansion card to the first expansion card, sends a routing table of the second expansion card to the second expansion card, and sends a routing table of the third expansion card to the third expansion card. Specifically, a process herein in which the SAS controller establishes the routing tables includes: calculating shortest paths from the SAS controller to the first expansion card, the second expansion card, and the third expansion card, and establishing a routing table of each expansion card in the SAS system according to the shortest paths from the SAS controller to the first expansion card, the second expansion card, and the third expansion card, where the routing table of each expansion card also includes the routing tables of the first expansion card, the second expansion card, and the third expansion card. For a specific step herein, refer to a process in the embodiment 1 in which the SAS controller completes expansion card traversal and establishes a routing table with a shortest path, and details are not described herein again.

A shortest path from the SAS controller to the third expansion card is calculated according to the obtained topology structure of the expansion card of the SAS system, and in a case in which the shortest path from the SAS controller to the third expansion card passes through the second expansion card, routing tables of the first expansion card and the second expansion card are established according to the shortest path from the SAS controller to the third expansion card.

Similarly, a shortest path from the SAS controller to the second expansion card is calculated according to the obtained topology structure of the expansion cards of the SAS system, and in a case in which the shortest path from the SAS controller to the second expansion card passes through the third expansion card, routing tables of the first expansion card and the third expansion card are established according to the shortest path from the SAS controller to the second expansion card.

This embodiment provides an expansion card traversal method of an SAS system. During a process of executing expansion card traversal, if it is found that there are two annularly connected expansion cards, it indicates that an annular topology structure of an expansion card in the embodiment 1 exists in the SAS system, and the two mutually connected expansion cards are no longer used as to-be-traversed expansion cards. The method provided in this embodiment supports the expansion card traversal of the SAS system in a topology structure of expansion cards of the SAS system in the embodiment 1 or the embodiment 2, so that an SAS system with higher reliability proposed in the embodiment 1 or the embodiment 2 can successfully run. In addition, in the topology structure of the expansion cards, there may be more than one path from an SAS controller to an expansion card. In the method, efficient running of the SAS system in the topology structure of the expansion cards is implemented by means of designing a shortest path.

Embodiment 4

Figure 5:
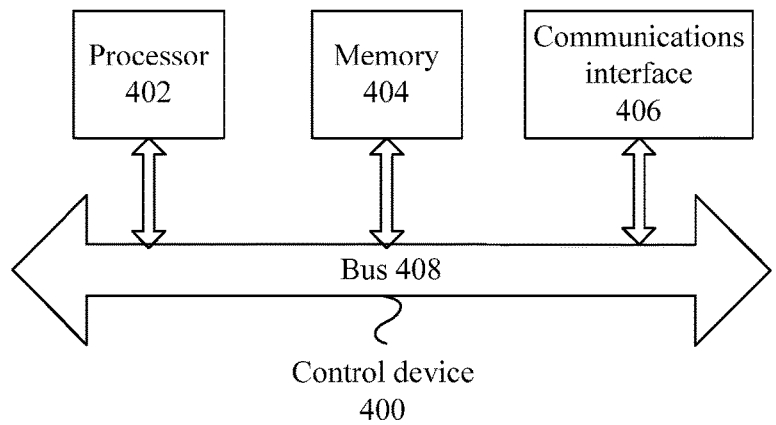
FIG. 5 is a schematic structural diagram of a control device according to embodiment 4 of the present application.

The embodiment 4 of the present application provides a control device, and a schematic structural diagram of the control device is shown in FIG. 5. A control device 400 includes a processor 402, a memory 404, a communication interface 406, and a bus 408. The processor 402, the memory 404, and the communication interface 406 have mutual communication connections through the bus 408.

The processor 402 may be a general-purpose central processing unit (CPU), a microprocessor, an application specific integrated circuit (ASIC), or one or more integrated circuits, and is configured to execute a related program, so as to implement the technical solution provided in the foregoing embodiments of the present application.

The memory 404 may be a read only memory (ROM), a static storage device, a dynamic storage device, or a random access memory (RAM). The memory 404 may store an operating system and another application program. When the technical solutions provided in the embodiments of the present application are implemented by using software or firmware, program code used to implement the technical solution provided in the foregoing embodiments of the present application is stored in the memory 404, and is executed by the processor 402.

The communication interface 406 is configured to communicate with an expansion card, so as to acquire topology structure information returned by the expansion card.

The bus 408 may include a channel through which information is transmitted between components (for example, the processor 402, the memory 404, and the communication interface 406) of the control device 400.

A hardware structure shown in FIG. 5 and the foregoing description are applicable to an SAS controller or an expansion card provided in each embodiment of the present application.

This embodiment provides a control device used in an SAS system. During a process of executing an expansion card traversal, if the control device receives, through a communication interface, topology structure information returned by an expansion card and finds that there are two annularly connected expansion cards, it realizes that an annular topology structure of expansion cards, as it is in the embodiment 1, exists in the SAS system. The control device no longer uses the two mutually connected expansion cards as to-be-traversed expansion cards by executing a related program in a memory. The control device supports the expansion card traversal of the SAS system in a topology structure of expansion cards of the SAS system as exemplified in the embodiment 1 or the embodiment 2, so that an SAS system with higher reliability, as proposed in the embodiment 1 or the embodiment 2, can successfully run. In addition, in the topology structure of the expansion cards, there may be more than one path from an SAS controller to an expansion card. By means of designing a shortest path, the control device implements efficient running of the SAS system in the topology structure of the expansion cards.

Embodiment 5

Figure 6A:
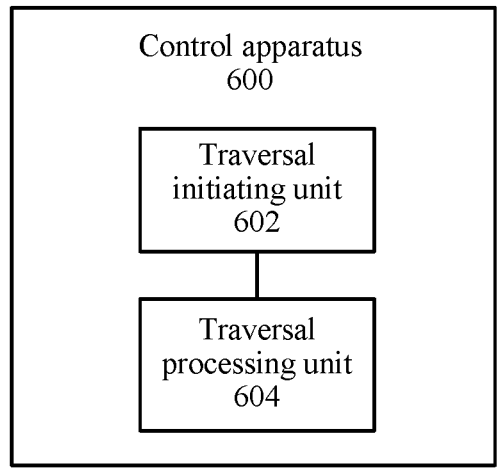
FIG. 6a and FIG. 6b are schematic structural diagrams of a control apparatus according to embodiment 5 of the present application.

The embodiment 5 of the present application provides a control apparatus, and a schematic structural diagram of the control apparatus is shown in FIG. 6a. The control apparatus 600 is used for an SAS system, and the SAS system includes: the control apparatus 600, a first expansion card, a second expansion card, and a third expansion card. In practice, the control apparatus 600 may be an SAS controller or an expansion card as exemplified in the foregoing embodiment 1 or embodiment 2, and an actual implementation of the control apparatus 600 may be the control device 400 in the foregoing embodiment 4.

The control apparatus 600 includes: a traversal initiating unit 602, configured to initiate expansion card traversal to obtain a topology structure of expansion cards of the SAS system; and
 a traversal processing unit 604, configured to: receive, via the first expansion card, topology structure information returned by the second expansion card, where the topology structure information returned by the second expansion card includes that the second expansion card is connected to the third expansion card; receive, via the first expansion card, topology structure information returned by the third expansion card, where the topology structure information returned by the third expansion card includes that the third expansion card is connected to the second expansion card; and no longer use the second expansion card as a to-be-traversed expansion card and no longer use the third expansion card as a to-be-traversed expansion card.

Specifically, for functional details of the traversal initiating unit 602, refer to step 202 of the traversal method in the embodiment 3; for functional details of the traversal processing unit 604, refer to step 204 and step 206 of the traversal method in the embodiment 3. Details are not described herein again.

Figure 6B:
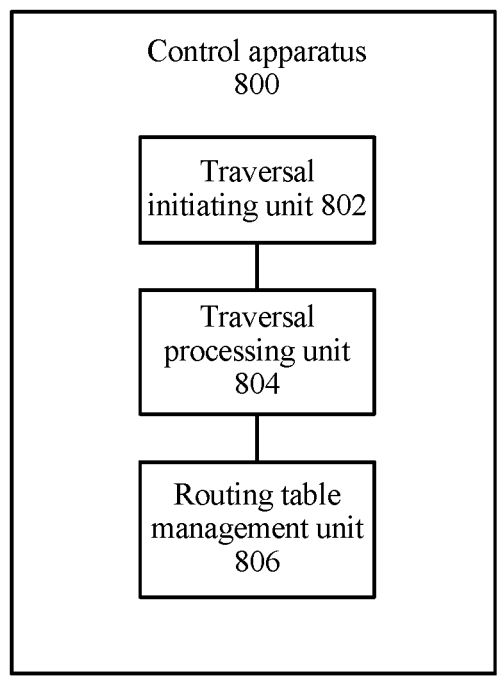

Optionally, as shown in FIG. 6b, a control apparatus 800 includes a traversal initiating unit 802 whose function is similar to that of the traversal initiating unit 602 in the control apparatus 600 and a traversal processing unit 804 whose function is similar to that of the traversal processing unit 604, and further includes a routing table management unit 806, configured to: establish a routing table of each expansion card and send the routing table to each expansion card according to a SAS expansion card traversal result obtained by the traversal processing unit 804, namely, a situation of a connection between expansion cards of the SAS system. FIG. 2 is used as an example. If the control apparatus 800 is applied to the SAS system, a topology structure that is of an expansion card of the SAS system and that is obtained by the traversal processing unit 804 is: child expansion cards of expansion card 1 are expansion card 2 and expansion card 3, child expansion card of the expansion card 2 is expansion card 4, child expansion card of the expansion card 3 is expansion card 5, and child expansion cards of both the expansion card 4 and the expansion card 5 are expansion card 6, where a child expansion card of an expansion card refers to an expansion card that is connected to the expansion card and that establishes a communication connection to the SAS controller via the expansion card. According to connection relationships of the expansion cards, the routing table management unit 806 respectively establishes routing tables of the first expansion card, the second expansion card, and the third expansion card, and sends a routing table of the first expansion card to the first expansion card, sends a routing table of the second expansion card to the second expansion card, and sends a routing table of the third expansion card to the third expansion card.

Specifically, a process herein in which the routing table management unit 806 establishes the routing tables includes: calculating a shortest path from the SAS controller to the third expansion card, and in a case in which the shortest path from the SAS controller to the third expansion card passes through the second expansion card, establishing routing tables of the first expansion card and the second expansion card according to the shortest path from the SAS controller to the third expansion card. Similarly, a shortest path from the SAS controller to the second expansion card is calculated according to the obtained topology structure of the expansion card of the SAS system, and in a case in which the shortest path from the SAS controller to the second expansion card passes through the third expansion card, routing tables of the first expansion card and the third expansion card are established according to the shortest path from the SAS controller to the second expansion card. For a specific step herein, refer to a process in the embodiment 1 in which the SAS controller completes expansion card traversal and establishes a routing table with a shortest path, and details are not described herein again.

The embodiment 5 provides a control apparatus applied to an SAS system. During a process of executing expansion card traversal, if the control apparatus finds that there are two annularly connected expansion cards, it indicates that an annular topology structure of expansion cards, as shown in the embodiment 1, exists in the SAS system, and the two mutually connected expansion cards are no longer used as to-be-traversed expansion cards. The control apparatus supports the expansion card traversal of the SAS system in a topology structure of expansion cards of the SAS system, as shown in the embodiment 1 or the embodiment 2, so that an SAS system with higher reliability as proposed in the embodiment 1 or the embodiment 2 can successfully run. In addition, in the topology structure of the expansion cards, there may be more than one path from an SAS controller to an expansion card. By means of designing a shortest path, the control apparatus implements efficient running of the SAS system in the topology structure of the expansion card.

Embodiment 6

The embodiment 6 of the present application provides an expansion card, where the expansion card includes a first port and a second port.

The expansion card establishes a communication connection to still another expansion card through the first port via another expansion card, and the expansion card is connected to the still another expansion card through the second port.

Specifically, for a connection relationship between the expansion card and the still another expansion card, refer to a connection relationship between an expansion card 5 and an expansion card 6 in the embodiment 1, that is, the expansion card 5 establishes a communication connection to the expansion card 6 through a port via expansion cards 3, 1, 2, and 4, and the expansion card 5 is further connected to the expansion card 6 through another port. A manner in which the expansion card is connected to another expansion card supports implementation of a topology structure of an expansion card in the SAS system in the embodiment 1 and the embodiment 2.

Optionally, the expansion card broadcasts a received SAS system status change message through another port than the second port. Specifically, the second port may be a subtractive attribute port.

Optionally, the expansion card does not broadcast a received SAS system status change message.

Figure 7:
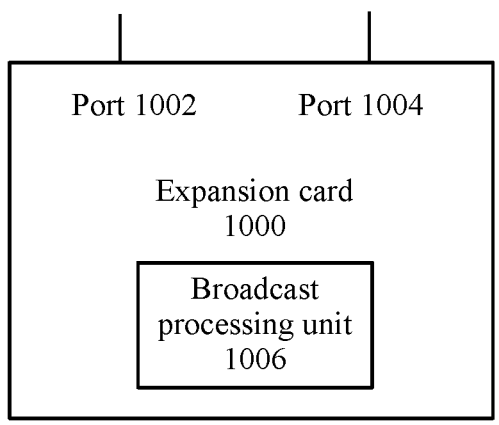
FIG. 7 is a schematic structural diagram of an expansion card according to embodiment 6 of the present application.

Specifically, a schematic structural diagram of the foregoing two optional expansion cards is shown in FIG. 7. An expansion card 1000 includes a port 1002 and a port 1004, and actually may further include another port, where the expansion card 1000 establishes a communication connection to another expansion card through the port 1002, and is connected to still another expansion card through the port 1004. The expansion card 1000 further includes a broadcast processing unit 1006, where the broadcast processing unit 1006 may be actually a broadcast primitive processor (BPP). A function of the broadcast processing unit 1006 is to process an SAS system status change message received by the expansion card 1000, that is, broadcast primitive.

The broadcast processing unit 1006 may be configured as follows: when receiving the SAS system status change message from any port, the expansion card 1000 broadcasts the SAS system status change message through the second port and a port except the port receiving the SAS system status change message. The second port may be set as a subtractive attribute port.

The broadcast processing unit 1006 may also be configured as follows: when receiving the SAS system status change message from any port, the expansion card 1000 does not broadcast the SAS system status change message through any port of the expansion card 1000.

The foregoing configuration of a function of the broadcast processing unit 1006 may be performed in an out-of-band manner, that is, the function of the broadcast processing unit 1006 is directly configured by using an interface of the expansion card 1000. Alternatively, the foregoing configuration of the function of the broadcast processing unit 1006 may also be performed in an in-band manner, that is, a configuring message is delivered to the expansion card 1000 by using an SAS controller, or the function may also be configured at delivery of the expansion card 1000.

The embodiment 6 provides an expansion card for an SAS system. A manner in which the expansion card is connected to another expansion card supports a topology structure of an expansion card of the SAS system in the embodiment 1 or the embodiment 2. In addition, a problem that an SAS system status change message is circularly broadcast because of SAS system improvement is resolved by improving a manner in which an expansion card processes the SAS system status change message, so that an SAS system with higher reliability as proposed in the embodiment 1 or the embodiment 2 can successfully run.

In the foregoing embodiments, the descriptions of embodiments have respective focuses. For a part that is not described in detail in an embodiment, reference may be made to related descriptions in other embodiments. It should be noted that, implementation details of an SAS controller part in the embodiment 1 are the same as implementation details of the control apparatus in the embodiment 5 in essence. In addition, methods executed by the SAS controller part in the embodiment 1, the control device in the embodiment 4, and the control apparatus in the embodiment 5 during running are the same as that of the method embodiment in essence, and mutual reference may be made to technical details among the three embodiments. Implementation details of an expansion card part in the embodiment 1 are the same as implementation details of an expansion card in the embodiment 6, and mutual reference may be made to technical details between the two embodiments.

Finally, it should be noted that the foregoing embodiments are merely intended for describing the technical solutions of the present application but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A serial attached small computer system interface (SAS) system, comprising an SAS controller, a first expansion card, a second expansion card, and a third expansion card,
   wherein the first expansion card is connected to the SAS controller and additionally comprises a first port and a second port;
   wherein the second expansion card comprises a third port and a fourth port, and is in communication with the SAS controller through a communication channel between the third port and the first port of the first expansion card;
   wherein the third expansion card comprises a fifth port and a sixth port, and is in communication with the SAS controller through a communication channel between the fifth port and the second port of the first expansion card; and
   wherein the SAS controller is configured to:
   initiate an expansion card traversal to obtain a topology structure of expansion cards in the SAS system;
   receive topology structure information from the second expansion card and the third expansion card respectively; and
   when the received topology structure information indicates that the fourth port of the second expansion card is directly connected to the sixth port of the third expansion card, set the second expansion card and the third expansion card as not to be involved in subsequent expansion card traversal.

2. The SAS system according to claim 1, wherein the second expansion card broadcasts a received SAS system status change message through a port except the fourth port, and the third expansion card broadcasts a received SAS system status change message through a port except the sixth port.

3. The SAS system according to claim 2, wherein the fourth port of the second expansion card and the sixth port of the third expansion card are subtractive attribute ports.

4. The SAS system according to claim 1, wherein the second expansion card is configured not to broadcast a received SAS system status change message.

5. The SAS system according to claim 1, wherein the third expansion card is configured not to broadcast a received SAS system status change message.

6. The SAS system according to claim 1, wherein the SAS controller is further configured to:
   calculate a shortest path from the SAS controller to the third expansion card according to the obtained topology structure of the expansion cards in the SAS system; and
   if the shortest path from the SAS controller to the third expansion card passes through the second expansion card, establish routing tables of the first expansion card and the second expansion card according to the shortest path.

7. An expansion card traversal method for use in a serial attached small computer system interface (SAS) system, wherein the SAS system comprises an SAS controller, a first expansion card, a second expansion card, and a third expansion card; the first expansion card is connected to the SAS controller and additionally comprises a first port and a second port; the second expansion card comprises a third port and a fourth port, and is in communication with the SAS controller through a communication channel between the third port and the first port of the first expansion card; the third expansion card comprises a fifth port and a sixth port, and is in communication with the SAS controller through a communication channel between the fifth port and the second port of the first expansion card; wherein the method comprises:
   initiating, by the SAS controller, an expansion card traversal to obtain a topology structure of expansion cards in the SAS system;
   receiving, by the SAS controller through the first expansion card, topology structure information from the second expansion card;
   receiving, by the SAS controller through the first expansion card, topology structure information from the third expansion card; and
   when the topology structure information received from the second expansion card and the third expansion card indicates that the fourth port of the second expansion card is directly connected to the sixth port of the third expansion card, setting, by the SAS controller, the second expansion card and the third expansion card as not to be involved in subsequent expansion card traversal.

8. The method according to claim 7, further comprising:
   calculating, by the SAS controller, a shortest path from the SAS controller to the third expansion card according to the obtained topology structure of the expansion cards of the SAS system; and
   if the shortest path from the SAS controller to the third expansion card passes through the second expansion card, establishing routing tables of the first expansion card and the second expansion card according to the shortest path.

9. A controlling device of a serial attached small computer system interface (SAS) system, wherein the SAS system further comprises a first expansion card, a second expansion card, and a third expansion card; the first expansion card is connected to the controlling device and additionally comprises a first port and a second port; the second expansion card comprises a third port and a fourth port, and is in communication with the controlling device through a communication channel between the third port and the first port of the first expansion card; the third expansion card comprises a fifth port and a sixth port, and is in communication with the controlling device through a communication channel between the fifth port and the second port of the first expansion card; wherein the controlling device comprises:

a communication interface, configured to connect with the first expansion card;

a memory, configured to store program instructions; and a processor, configured to execute the program instructions;

wherein the processor, by executing the program instructions, is configured to:

initiate an expansion card traversal to obtain a topology structure of expansion cards in the SAS system;

receive, through the first expansion card, topology structure information from the second expansion card;

receive through the first expansion card, topology structure information from the third expansion card; and when the topology structure information received from the second expansion card and the third expansion card indicates that the fourth port of the second expansion card is directly connected to the sixth port of the third expansion card, set the second expansion card and the third expansion card as not to be involved in subsequent expansion card traversal.

10. The controlling device according to claim 9, wherein the processor, by executing the program instructions, is further instructed to:

calculate a shortest path from the SAS controller to the third expansion card according to the obtained topology structure of the expansion cards of the SAS system; and establish routing tables of the first expansion card and the second expansion card according to the shortest path if the shortest path from the SAS controller to the third expansion card passes through the second expansion card.

* * * * *